United States Patent

[11] 3,556,043

[72] Inventor Louis L. Vayda
 Pittsburgh, Pa.
[21] Appl. No. 783,896
[22] Filed Dec. 16, 1968
[45] Patented Jan. 19, 1971
[73] Assignee Ambac Industries, Inc.
 a corporation of New York

[54] FILTER GAUGE
 4 Claims, 6 Drawing Figs.
[52] U.S. Cl. .................................................. 116/70,
 73/419
[51] Int. Cl. .................................................. G01l 19/12
[50] Field of Search ........................................ 73/419,
 388(Cursory), 406; 116/114.26, .17; 1/70, 117;
 210/90

[56] References Cited
 UNITED STATES PATENTS

| | | | | |
|---|---|---|---|---|
| 2,750,915 | 6/1956 | Carlberg | 116/114(.26)X |
| 3,027,865 | 4/1962 | Kautz et al. | 116/70X |
| 3,066,527 | 12/1962 | Stein | 73/118 |
| 3,094,969 | 6/1963 | Whiting | 116/117X |
| 3,183,882 | 5/1965 | Preece | 116/34X |
| 3,247,824 | 4/1966 | Rodgers | 73/419X |
| 3,279,418 | 10/1966 | Nilsson | 116/70 |
| 3,312,345 | 4/1967 | Rosaen | 210/90 |
| 3,388,682 | 6/1968 | Whiting | 116/70 |

Primary Examiner—Louis R. Prince
Assistant Examiner—Daniel M. Yasich
Attorney—Parmelee, Utzler and Welsh ABSTRACT: This invention relates to gauges for recording the clogging of conventional air filters and for displaying a suitable signal indicating the need for replacement of the filter. The gauge may be mounted upon the filter housing or in the case of internal combustion engines in the combustion air intake to the engine. The gauge includes a housing portion receiving a suitable spring--loaded deflectable diaphragm one face of which is exposed to suction pressure from within the combustion air intake and the opposite face of the diaphragm mounts a bearing member abutting a spring-loaded rotatable signal member, whereby deflection of the diaphragm due to increased suction pressure in the said air intake releases the spring-loaded signal member for rotation to display a signal indicating the need to replace the air filter. An alternate form of construction includes electrical contacts on the signal member whereby rotation thereof closes an electrical circuit to display the filter change signal at a position remote from the gauge.

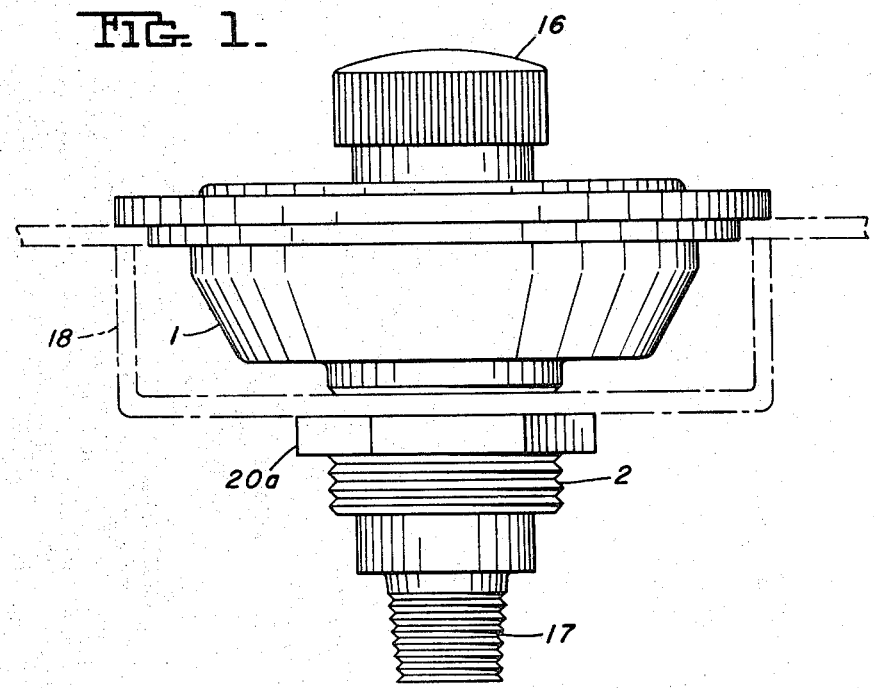
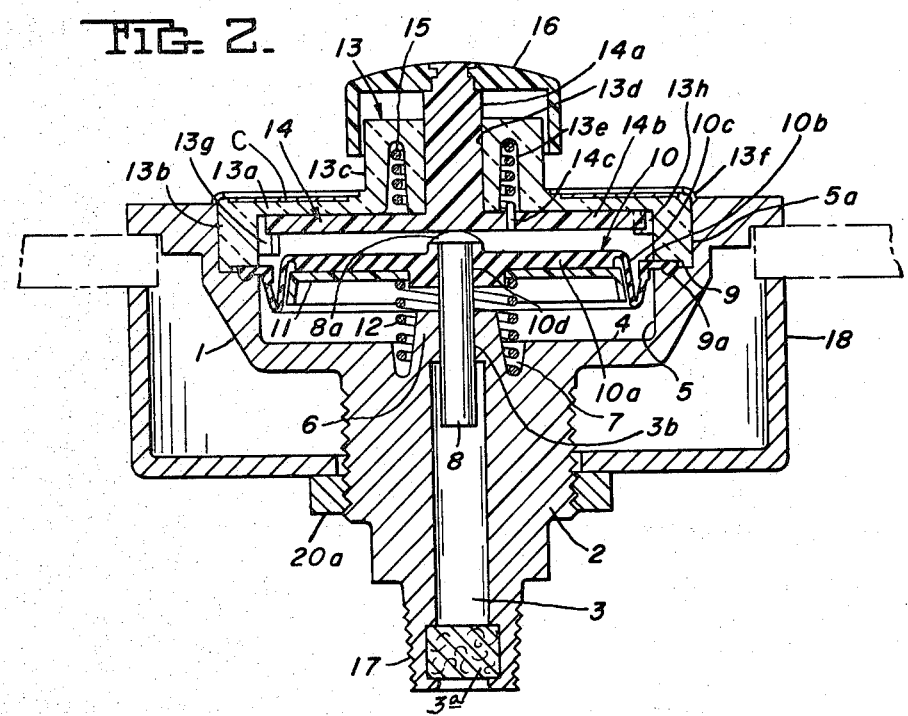

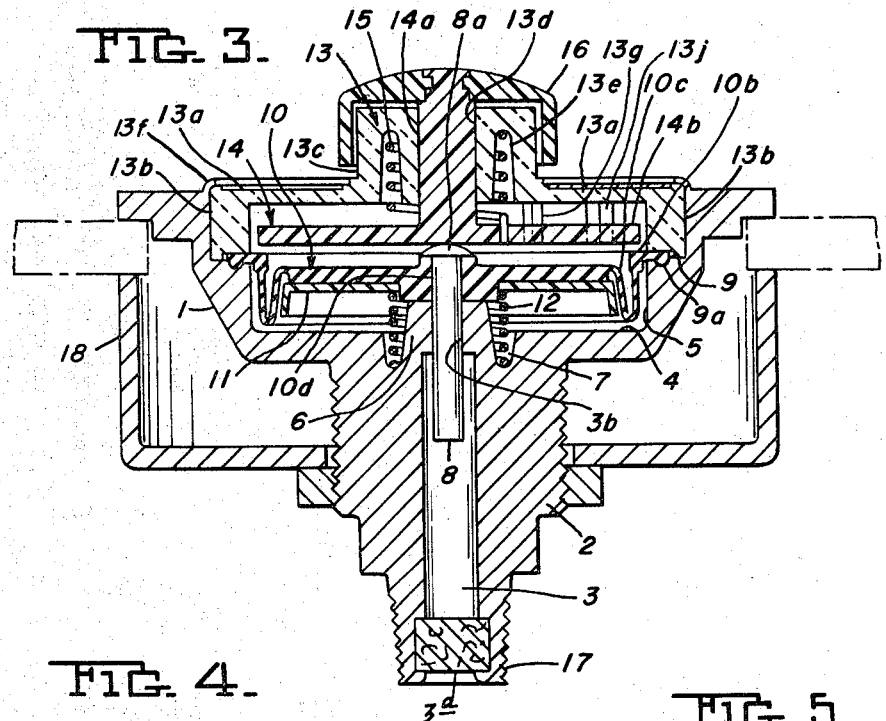
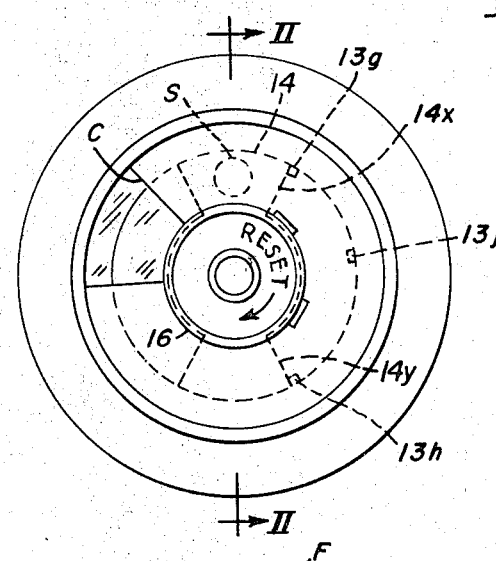
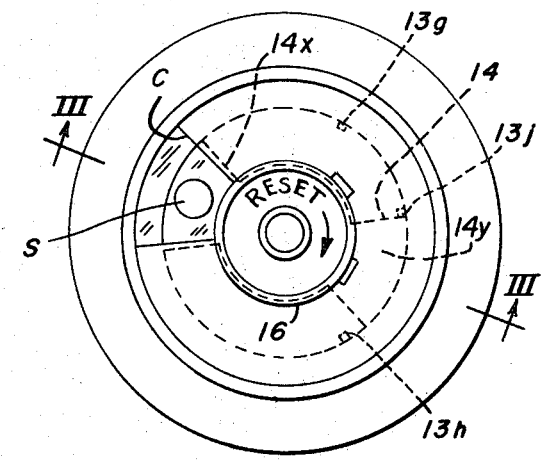
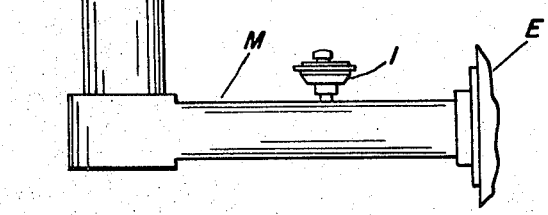
INVENTOR.
LOUIS L. VAYDA 3,556,043

FILTER GAUGE

BACKGROUND OF THE INVENTION

1. Field of the Invention

The invention relates to motor and engine testing particularly class 73, subclass 18—testing auxiliary units and class 92 expansible devices, diaphragm type.

2. Description of Prior Art

Known prior art includes U.S. Pat. Nos. 2,921,157; 3,066,527 and 3,185,041.

SUMMARY OF THE INVENTION

The invention is directed to a rotary-type, spring-biased filter gauge actuated by negative (suction) pressure within the air intake line of an internal combustion engine to register clogging of the air filter through which combustion air is supplied to the engine and the necessity for replacement of such air filter.

The filter body comprises a cup-shaped member having an open top face terminating in an apertured bottom extension, closed by a suitable filter member, for mounting in the combustion air intake line or extension thereof. A spring-biased flexible diaphragm disposed in said open top face of said cup-shaped portion is provided with a centrally disposed apertured rigid diaphragm plate of less diameter than that of the diaphragm and receiving a suitable rigid member which is slidably disposed in said apertured filter body bottom extension.

Mounted in the open top face of the filter body and overlying the said flexible diaphragm therein is a filter gauge closure member having a depending peripheral flange received in the filter cup-shaped member, and a central upstanding apertured embossment receiving the spring-loaded target member and attached operating knob.

Increased suction in the air intake line acting on the spring-biased flexible diaphragm causes deflection thereof releasing the target member for rotation to expose a visual signal indicating need to change the air filter.

One object of the invention is to provide a gauge for recording the degree of clogging of an air filter, such as employed with internal combustion automotive engines, and to display a continuous signal when the air filter is sufficiently clogged with dirt as to no longer supply sufficient volume of air to the vehicle motor for efficient operation.

DESCRIPTION OF THE DRAWING

FIG. 1 shows a side elevation of the assembled gauge;

FIG. 2 shows a vertical cross section taken on lines II-II through the gauge of FIG. 4 when not under suction pressure from a dirty filter;

FIG. 3 shows a view similar to FIG. 2 taken on the lines III-III of FIG. 5 with the diaphragm deflected under suction from a dirty filter;

FIG. 4 shows a plan view of the gauge of FIG. 1 with the target spot concealed;

FIG. 5 shows a plan view of the gauge of FIG. 1 with the target spot displayed; and FIG. 6 shows one mode of mounting the gauge as in the air intake to the associated internal combustion engine.

DESCRIPTION OF THE PREFERRED EMBODIMENT

Referring now in detail to the drawing, FIG. 2 shows a vertical cross section through the assembled gauge of FIG. 4, with the target spot S concealed. The gauge is comprised of an open circular cup-shaped portion 1 having a depending stem portion 2 provided with an aperture 3 extending therethrough into communication with said cup portion 1. The bottom end of stem 2 is preferably closed by a suitable filter member 3a. Said cup portion 1 is provided with an inner annular bottom wall portion 4, an inner annular sidewall portion 5 and a central upstanding embossment 6, enclosed by an annular indentation 7 connecting said embossment 6 and bottom wall portion 4. Said aperture 3, of stem portion 2, adjacent the inner end thereof is of reduced diameter 3b to slidably receive a headed elongated stem member 8, having a headed portion 8a. Said cup portion 1 has the inner sidewall 5 thereof offset to provide a shoulder 9 defined by the sidewall portion 5a. Preferably shoulder 9 has an annular depression 9a, therein for mounting a suitably flexible deflectable diaphragm 10. Said diaphragm 10 has a suitably thickened central portion 10a and a suitably thickened peripheral portion 10b joined by a thinner more flexible portion 10C. Said diaphragm 10 has central embossments on opposite faces thereof enclosing an aperture 10d for reception of pin 8 which is mounted for reciprocal movement in apertures 3 and 3b of stem portion 2. Underlying diaphragm 10 is a suitable diaphragm plate 11 which abuts a coil spring 12 to restrict diaphragm deflection to the portions 10c thereof under suction through aperture 3 and 3b of gauge stem portion 2. The deflection of these latter members 10, 11 and 12 is controlled by movement of pin 8 mounted in gauge stem portion 6.

Overlying diaphragm 10 within the valve body cup portion 5a and supported therein is a filter gauge closure member 13 comprised of a preferably transparent platelike portion 13a having a depending peripheral flange 13b and a central upstanding embossment 13c having an aperture 13d extending therethrough. Said platelike portion 13a and embossment 13c having an annular inwardly extending recess 13e for a purpose herein after set forth. Filter gauge closure member 13 may be secured in place, within the filter gauge body portion by any suitable means, such as spinning over a projection 13f on the gauge body portion 5a as shown in FIG. 1 to embrace the periphery of member 13.

Prior to securing closure member 13 in place, a suitable target member 14, such as shown in FIGS. 2, 3, 4 and 5, comprised of a stem portion 14a and base portion 14b comprised of two oppositely disposed arms 14x and 14y extending transversely thereof. Arm 14b has a suitable aperture 14c therein for receiving one end of a coiled torsional spring 15 disposed within openings 13e. A suitable turning knob 16 is suitably secured upon the outer end of stem portion 14a in spaced relation to closure member stem portion 13C. When thus assembled target member portion 14b abuts the head portion 8a of pin 8 and pin 8 is held in such abutting engagement by the encircling coil spring 12 reacting against diaphragm member 11 when the gauge is not under suction pressure within valve body 1 stem opening 3.

The target member 14 of FIG. 2 in the assembly thus described is under a torsional stress from spring 15 but rotation of member 14 is resisted by the head 8a of pin 8 being urged upwardly by spring 12 acting through diaphragm plate member 11. Additionally, as best shown in shown in FIG. 4, target member 14 in this elevated position is restricted by abutting engagement with stops 13g and 13h of member 13b.

For convenience in reading the target spot S, its location during "clean filter" conditions is concealed under a cover member C overlying the top face of the closure member 13, with an opening in member C to expose spot S when the filter is so filled with dirt as to require replacement.

Referring now to FIGS. 2, 3 and 6 of the drawings, as the air filter F becomes progressively clogged with dirt, suction pressure in the air inlet M to the engine E increases and acts upon the lower end of the gauge stem 2 and the pin 8 therein to draw pin 8 progressively downwardly within gauge stem channel 3. Movement of pin 8 is resisted by compression spring 12 acting through diaphragm plate 11 resisting movement of diaphragm 10. After the suction pressure within gauge stem portion 3 increases to a degree sufficient to retract pin 8 against the pressure from diaphragm spring 12, the diaphragm 10 moves downwardly with target member portion 14b following, under pressure from spring 15, to a position below stop 13h. At this point spring 15 expands causing the target member 14 to move downward out of engagement with target stops 13g and 13h. Torsion spring 15 then rotates target member 14 in a counterclockwise direction from the position of FIG. 4 to that of FIG. 5 and in abutting engagement with stop 13j so as to expose the target member S upon plate 14 between the open ends of cover member C. This latter target member S will then be continuously displayed, even though the internal combustion engine is stopped and spring 12 returns the head 8a of pin 8 into abutment with target member portion 14b. After the air filter is changed, sufficient vertical pressure and torque exerted on target member knob 16 permits the target member S to be rotated from right to left beneath stop 13h and into concealed position as in FIGS. 2 and 4.

The diaphragm 10 disclosed in FIG. 2 is referred to as of the "rolling type", by reason of the thickened central portion 10a, being reinforced by the diaphragm plate 11, is thereby restricted to vertical movement about the thinner peripheral portions 10c which are anchored in the gauge body upon the gauge shoulder 9a. Such type diaphragm 10 is more sensitive to pressure from head 8a of pin 8 for release of target member 14 for rotation after the air filter becomes sufficiently clogged with dirt so as to prevent obtaining maximum efficient operation of the internal combustion engine with which it is associated. It will be understood, however, that other forms of flexible diaphragm may be used.

The gauge body stem portion 2 may take other forms than shown herein where desired. The form shown, provides a threaded portion 17 for mounting the gauge in either the housing F for the air filter or in the combustion air intake M to the motor E. Where desired the gauge may be mounted upon any suitable panel by means of bracket 18 and nut 20a so as to be visible at all times from within the cab of a vehicle. In such mountings the end 17 of the gauge may be connected by any suitable means with the intake manifold of the engine.

I claim:

1. A gauge for registering a predetermined degree of suction pressure within the air intake manifold of an internal combustion engine, as a measure of the clogging of an air intake filter supplying combustion air to said intake manifold, comprising:
    a. an open faced annular hollow body portion having a closed bottom wall and an apertured depending bottom extension for connection with said air intake manifold;
    b. an annular recess extending inwardly from the open face of said body portion in spaced relation to said bottom wall thereof;
    c. an apertured flexible annular diaphragm mounted within said annular recess and extending across said body portion so as to overlie said bottom wall in spaced relation thereto;
    d. a spring biasing the central portion of said diaphragm towards said open end;
    e. headed rigid means mounted in the aperture in said flexible diaphragm and depending therefrom within said apertured bottom extension for movement relative thereto and exposed to suction pressure within the intake manifold;
    f. closure means mounted in fixed relation within said open face of the hollow body portion in spaced relation to said flexible diaphragm and comprising a transparent disclike body portion having a peripheral depending flange abutting the periphery of said flexible annular diaphragm and the underlying gauge body portion and an upstanding hollow head portion; and
    g. a torsion-spring-loaded horizontally rotatable and vertically moveable target member underlying the transparent face of closure member in abutting relation to said flexible diaphragm headed rigid means and having an upstanding central portion extending through said closure means, whereby suction within the air intake manifold acting through the flexible diaphragm retracts the headed member therein permitting said torsion spring to rotate the target member to display a change filter signal.

2. A gauge for registering a predetermined suction pressure within the air intake manifold of an internal combustion engine as a measure of the degree of clogging of the air filter through which the combustion air is drawn and the necessity for replacement thereof, comprising:
    a. an open face cup-shaped body portion having a depending apertured extension for establishing communication between said air intake manifold and said cup-shaped body portion;
    b. an apertured spring-loaded, deflectable annular diaphragm means extending transversely of said body portion in spaced relation to said depending apertured extension thereof and an elongated rigid member extending through the aperture in said diaphragm means and received in said apertured extension of said gauge body portion;
    c. apertured closure means mounted in said gauge body cup-shaped portion in vertically spaced relation to said diaphragm means and having a depending peripheral flange clamping the periphery of said diaphragm means to said gauge body cup-shaped portion,
    d. a spring-loaded rotatable annular target means mounted in said closure means and disposed within said gauge cup-shaped portion in spaced relation to said spring-loaded, deflectable annular means and in abutting engagement with said elongated rigid member therein; and
    e. said target means having a stem portion extending upwardly through said closure means aperture for reception of a turning knob for selective rotation of said target means to reset same after a filter replacement.

3. The gauge as defined in claim 2 wherein said apertured spring-loaded, deflectable annular diaphragm means comprises:
    a. a first thickened annular flattened body portion having a central apertured opening therethrough;
    b. a rigid diaphragm plate underlying said annular flattened body portion providing a bearing for said spring restricting the area of deflection of said annular diaphragm means;
    c. a second annular thickened portion defining the periphery of said annular diaphragm means; and
    d. a diaphragm portion of substantially lesser thickness connecting said thickened diaphragm portions and defining the area of deflection of said deflectable diaphragm.

4. The gauge as defined in claim 2 wherein said closure means has a pair of annularly spaced depending abutments upon its inner face for engagement by said spring-loaded rotatable target means whereby said target means, upon initial deflection of said diaphragm, will be moved downwardly to a point below said pair of spaced depending abutments whereby said target means is rotated to continuously display a change filter signal and after the filter is changed the target means may be raised by said turning knob and rotated to a second position to continuously display a clear filter signal.